Patented Oct. 23, 1923.

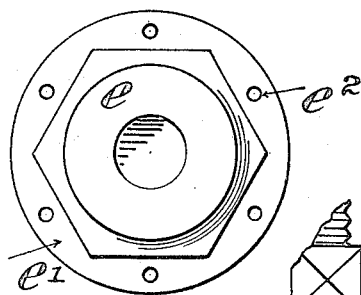
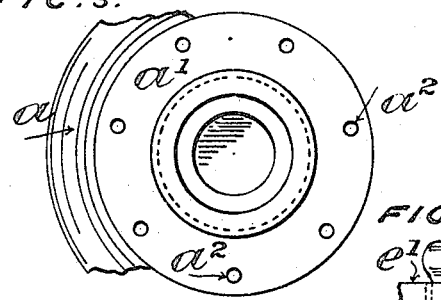
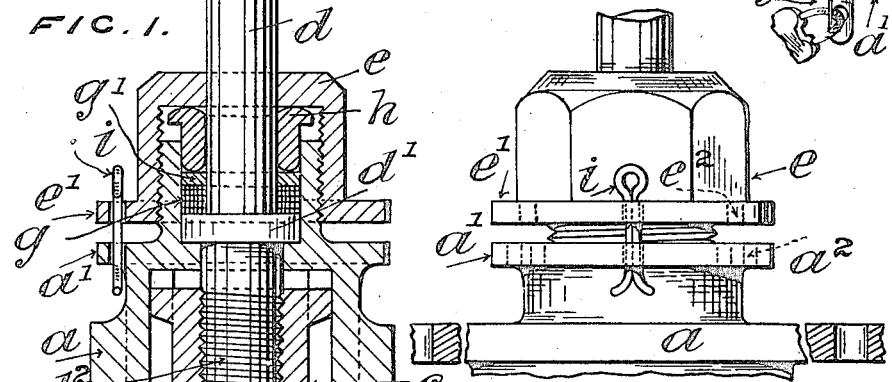
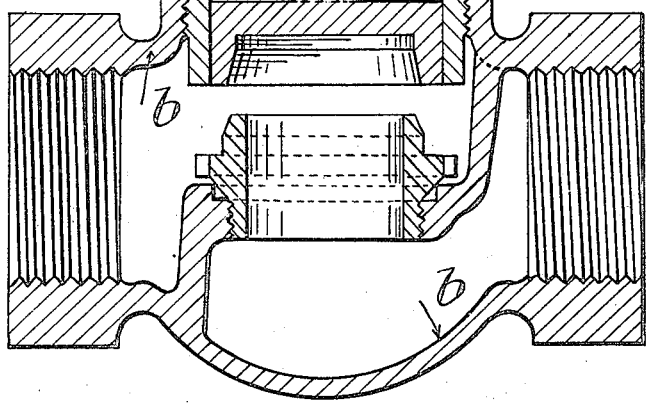
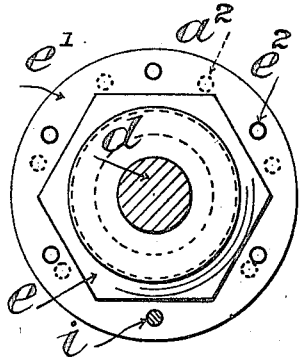

1,471,825

UNITED STATES PATENT OFFICE.

BENJAMIN BUTLER AND WILFRED BUTLER, OF DUKINFIELD, ENGLAND.

STOPCOCK OR VALVE.

Application filed November 26, 1921. Serial No. 517,897.

*To all whom it may concern:*

Be it known that we, BENJAMIN BUTLER and WILFRED BUTLER, subjects of the King of Great Britain and Ireland, residing at Borough Brace and Ironworks, Dukinfield, in the county of Chester, England, have invented new and useful Improvements in or Connected with Stopcocks or Valves, of which the following is a specification.

This invention relates to improvements in or connected with stop cocks or valves and in particular to the class of valve forming the subject matter of our United States of America Patent No. 1,370,875.

The object of the present improvements is to provide a flange locking arrangement for the nut which screws on the upper part of casting which guides the movable barrel, and which nut holds down the rotatable valve spindle with screw thread engaging the movable barrel. This flange locking arrangement also provides for a fine adjustment of the nut and consequently of the rotatable spindle, and, said adjustment can be definite or known, and any adjustment can be secured by the application of a split pin, a screw, or even a locking device.

The attached drawing illustrates our improvements in stop cocks or valves, and, in said drawing:

Fig. 1 is a vertical section of a stop cock or valve embodying our flange locking arrangement.

Fig. 2 is a plan of the main nut which screws down on the upper casting forming part of the main body of the valve.

Fig. 3 shows a broken plan of the upper casting above mentioned.

Fig. 4 shows in elevation the main nut and part of the upper casting, the latter being of slightly different design in so far as it indicates a bolted-on flange.

Fig. 5 indicates a form of lock device for locking the flanges.

Fig. 6 is a plan view of the main nut disposed over the bored flange on the upper casting which forms one half or part of the body of the valve.

In carrying our invention into effect we fashion the upper portion of valve body or casting $a$ which screws onto the main body casting $b$ with a flange $a'$. This casting $a$ effectively guides and supports the movable barrel $c$ in the example illustrated, and receives the collar $d'$ on the rotatable spindle $d$, the casting being externally threaded for reception of the rotatable nut $e$. The flange $a'$ is drilled to produce say seven vertical holes $a^2$ which are concentrically disposed with respect to the vertical axis of the valve, the said holes being equi-distant one from another. The rotatable spindle $d$ has a lower screwed extremity $d^2$ to engage the movable barrel $c$, and is also formed with the above-mentioned collar $d'$, the upper part of the spindle being plain, save for provision to attach the usual hand-wheel or the like. On the spindle $d$ fits a fibre or other compressed ring or a packing $g$ on which may bear a phosphor-bronze or other ring $g'$, or it might be a ball-bearing device, upon which in turn bears a sleeve $h$ with upper collar or ruff, the top and bottom of which may be rounded to reduce friction. Instead of a collar, a groove or recess may be fashioned in the sleeve. Any other suitable provision may be made for packing the spindle $d$.

The nut $e$ has a lower flange $e'$ or a collar formed with it, and such flange $e'$ is drilled to produce say six holes $e^2$ concentrically disposed and movable over the holes $a^2$ in the flange $a'$ on the upper portion of valve body or casting $a$. Such nut $e$ is internally threaded and bored to fit the rotatable spindle $d$. Thus, the said nut $e$ can screw onto the thread on the upper portion of valve body or casting $a$ and can bring pressure to bear on the collar $d'$ through whatever intermediate devices are used to hold the spindle down and act on the packing devices surrounding said spindle.

By adjusting the nut $e$ by screwing same down, the rotatable spindle $d$ is acted upon (without rotating same) to any desired extent. When any two holes $a^2$ and $e^2$ coincide in the two flanges $a'$ and $e'$, the adjustment can be fixed by passing a split-pin such as $i$ through the two flanges $a'$, $e'$. A screw, or a locking appliance might be used for this purpose. The Fig. 5 indicates a locking appliance marked $i^x$.

Should additional adjustment be necessary it is only requisite to remove the split pin $i$, and to rotate the nut $e$ until two other holes $a^2$ $e^2$ coincide, as required, and to re-apply the split pin or the like. Thus, a definite and known adjustment is obtainable by fractional rotation of the main nut. The rotary spindle holding (and packing adjusting) means provided in the form of nut and flange are also extremely strong and of neat appearance.

Further the flange inter-connecting means constitute a visible lock between the edges of the two provided flanges.

We declare that what we claim is:

1. In stop cocks or valves, a main body portion, an upper body portion, a flange on said upper body portion having spaced apertures therein, said upper body portion having an exteriorly threaded extension, an interior annular shoulder at the base of said extension, a threaded locking nut adapted to engage said extension and having a flange provided with spaced apertures adapted to register with the apertures in the flange of the upper body portion, a valve actuating spindle extending into the upper body portion, packing devices about the spindle within said extension, said nut being adapted to act on the packing devices, and engaging means for interconnecting the registering apertures in the flanges of the nut and body.

2. A stop cock or valve, comprising a main body portion, an upper body portion and means to connect the two, a flange on the upper body portion having spaced apertures therein, a threaded sleeve on the upper body portion, an interior annular shoulder at the base of said sleeve, a locking nut having an extension at its inner end, said extension having a bored aperture, a screw thread on said locking nut for cooperating with the thread on the sleeve, a valve actuating spindle extending into the body portion and having a collar thereon resting on said annular shoulder, packing means surrounding the spindle above the collar and acted on by the locking nut, and detachable means to connect registering apertures in the flange and extension.

3. A stop cock or valve, comprising a main body portion and an upper body portion, means for connecting said body portions together, said upper body portion having an apertured extension and a threaded sleeve, an interior annular shoulder at the base of said threaded sleeve, a locking nut having an apertured flange at the base thereof, the apertures of said extension and flange being adapted to be brought into register, said locking nut being threaded for engagement with said sleeve, a valve actuating spindle extending into the upper body portion, packing means about said spindle within said sleeve and disposed in position to be acted on by said locking nut, and detachable means for engaging registering apertures in the extension and flange.

In testimony whereof we have signed our names to this specification.

BENJAMIN BUTLER.
WILFRED BUTLER.